United States Patent [19]

Fowler

[11] 3,836,388

[45] Sept. 17, 1974

[54] DISTRIBUTING A FLUID EVENLY OVER THE SURFACE OF AN ARTICLE

[75] Inventor: William H. Fowler, Bethlehem, Pa.

[73] Assignee: Western Electric Company, Incorporated, New York, N.Y.

[22] Filed: Oct. 18, 1972

[21] Appl. No.: 298,698

[52] U.S. Cl. .................... 117/120, 117/67, 117/119, 118/50, 118/63

[51] Int. Cl. .................... B05c 7/02

[58] Field of Search ......... 117/38, 66, 67, 119, 120; 118/212, 50, 63; 425/110

[56] References Cited

UNITED STATES PATENTS

| | | | |
|---|---|---|---|
| 2,946,697 | 4/1960 | Petro | 117/38 A |
| 3,357,856 | 12/1967 | Ragan et al. | 117/212 |
| 3,367,789 | 2/1968 | Mommsen | 117/38 X |
| 3,370,978 | 2/1968 | Pollack et al. | 117/62 X |
| 3,533,155 | 10/1970 | Coucoulas | 29/471.1 |
| 3,576,940 | 5/1971 | Stone et al. | 117/218 X |
| 3,579,376 | 5/1971 | Vincent | 117/212 |
| 3,617,339 | 11/1971 | Kiwiet | 117/38 |
| 3,695,928 | 10/1972 | Boyer et al. | 117/212 |
| 3,755,890 | 9/1973 | Klehm | 117/119 X |

*Primary Examiner*—Ralph Husack
*Assistant Examiner*—Shrive P. Beck
*Attorney, Agent, or Firm*—R. Y. Peters

[57] ABSTRACT

In a method and apparatus for distributing silicone rubber over the surface of a substrate to encapsulate it, a precise quantity of fluid rubber is deposited by the apparatus at the center of the surface. The substrate is surrounded by orifices through which air is blown vertically upward past its edges. The upward movement of the air past the substrate draws the rubber from the center to the edges to completely coat the substrate and blow back any rubber that tends to run over. The orifices are larger at the corners to increase the flow of rubber thereto. The coated substrate is placed in a vacuum chamber to remove any trapped air or gases.

11 Claims, 6 Drawing Figures

DISTRIBUTING A FLUID EVENLY OVER THE SURFACE OF AN ARTICLE

BACKGROUND OF THE INVENTION

1. Field of the Invention

This invention relates to methods and apparatus for distributing fluid evenly over the surface of an article and, more particularly, distributing silicone rubber evenly over a thin-film circuit, without having it run over the edges, to form a coating thereon.

2. Description of the Prior Art

In the manufacture of certain semiconductor devices, integrated circuits are bonded to a thin-film circuit on one face of a ceramic substrate. The thin-film circuits, of necessity, have portions where one conductor must cross over another conductor. After bonding, the face of the substrate containing the integrated circuits, thin-film circuits and crossovers must be protected with a coating of silicone rubber.

In one prior-art method, a mask was positioned on the substrate to mask it inward from the edges about 0.025 inch. The thickness of this mask determined the amount of encapsulant required to fill its central portion and, therefore, the thickness of the resulting coating. The filled mask was immediately removed and the encapsulant was permitted to flow to the edges over the previously masked portion of the substrate. This process depended on surface tension to prevent the encapsulant from running over the edges and was not only awkward, but required continuous mask cleaning.

Another prior-art method, as described in copending application Ser. No. 95,821, filed Dec. 7, 1970 now U.S. Pat. No. 2,695,928 and assigned to the assignee hereof, is to place the equivalent of an encapsulant (photoresist) on the substrate and spin it while blowing air on the underside. This process works better with round substrates than rectangular ones and, although it prevents the photoresist from running onto the underside of a substrate, it does not prevent it from running over the edges.

Also, where leads are attached to the substrate, the spinning process puts an undesirable coating on the leads.

SUMMARY OF THE INVENTION

Accordingly, an object of the invention is to provide new and improved methods and apparatus for distributing a fluid evenly over the surface of an article without having the fluid run over the edges or coat leads.

With these and other objects in view, the present invention contemplates a method of distributing a first fluid over the surface of an article, wherein a predetermined amount of the first fluid is placed on the surface of the article. Then, a second fluid is flowed transversely past the edges of the article in such direction as to draw the first fluid to the edges but to blow back any fluid tending to run over such edges.

The present invention also contemplates a method of distributing a fluid over the surface of a rectangular article to encapsulate electronic circuits thereon. The articles are placed in a nest and a predetermined amount of fluid is dispensed near the center of the surface. The nest is surrounded by orifices which direct air flow transversely upward past the edges of the article; the flow being greater at the corners than at the midpoints of the edges. Air is admitted to the orifices and the low pressure generated at the edges of the substrate by air flow past them, draws the rubber to the edges. The greater flow of air at the corners provides a greater pressure drop there where it is needed to cause more flow of rubber toward the corners than the sides. This yields a more even distribution of the rubber coating. The flow of air past the edges blows back any rubber tending to run over the edges. The coated substrate is transferred to a vacuum chamber and any gas trapped under the integrated circuits, or crossovers, or in the silicone rubber, is removed to provide a dense encapsulating coating.

A suitable apparatus for distributing the first fluid over the surface of an article provides a means for dispensing a predetermined amount of the first fluid and a means for flowing a second fluid upward past the edges of the article. The apparatus also provides a rectangular nest of substantially the same size and shape as the article but a little larger. A plurality of orifices, for blowing air vertically upward, surrounds the nest and the orifices at the corners are made larger than those at the midpoints of the sides of the nest to increase flow at the corners. An elevator raises the coated article from the nest and a conveyor mechanism transfers the raised substrate to a vacuum chamber for outgassing.

BRIEF DESCRIPTION OF THE DRAWINGS

The invention can be understood better from the following more detailed description read in conjunction with the accompanying drawings.

DETAILED DESCRIPTION

Methods and apparatus embodying the invention will be described in connection with evenly distributing a fluid of silicone rubber over the surface of a substrate to encapsulate a thin-film circuit thereon. However, it is to be understood that the invention may be used for evenly distributing other fluids over other articles.

Figure 1:
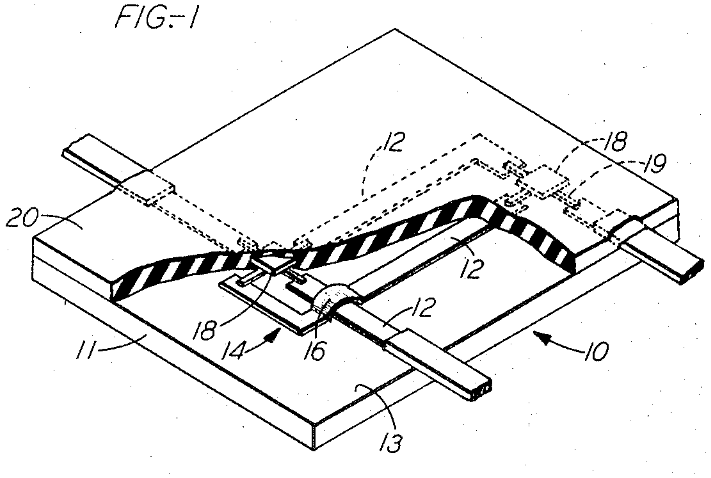
FIG. 1 is an isometric view of a substrate, having a coating of silicone rubber over thin-film and integrated circuits on one of its surfaces.

Referring now to FIG. 1, there is shown a substrate 10, having edges 11, of insulating material, e.g., aluminum oxide ceramic, about 1.4 sq. in. in area. Conductors 12, comprised mostly of a thin film of metal such as gold, form a thin-film circuit 14, on one surface of the substrate 10.

Thin-film circuits 14 are generated by methods well known in the art and further information concerning them, their materials and their structures may be had by consulting R. W. Berry, P. M. Hall and M. T. Harris,

*Thin Film Technology*, D. VanNostrand, Princeton, 1968 or L. I. Maissel and R. Glang, *Handbook of Thin Film Technology*, McGraw-Hill, New York, 1970.

Generally, thin-film circuits are far more complex than the circuit 14 of FIG. 1 which has been simplified for ease of understanding. The circuit 14 contains, as an example, a crossover 16 which permits one conductor 12 to cross over another conductor 12 without touching it, i.e., without shorting. The circuit 14 may also contain semiconductor devices 18, e.g., integrated circuits or transistors. The devices 18 are bonded to the conductors 12 of the circuit 14 by any suitable bonding technique. One such technique is compliant bonding of their beam leads 19 to the conductors 12 as disclosed in Coucoulas U.S. Pat. No. 3,533,155.

In accordance with the present invention, the surface of the substrate 10 containing the circuit 14 and the devices 18 is covered with a coating 20 of room-temperature-vulcanizing silicone rubber which is fluid during the entire coating process. In about sixteen hours, at room temperature and 65% relative humidity, the rubber cures to encapsulate the circuit and devices with a tough, dense, protective cover. The silicone rubber is sold by the Dow-Corning Co. under the trade designation "RTV 3145" and has a dispersion number of 96-084. Two parts of RTV 3145 are mixed with one part xylene by volume to achieve the preferred viscosity and flow characteristics.

Any entrained air such as might be trapped beneath the devices 18 or crossover 16 must be removed. Particularly, any air or gases must be removed from beneath crossover 16 so that the coating 20, when the material is fluid, will flow under as well as over it. When cured, the coating under the crossover 16 prevents its collapse, and any resultant shorting, while the coating over it provides a protective covering.

Method of Distributing the Fluid Coating

Figure 3:
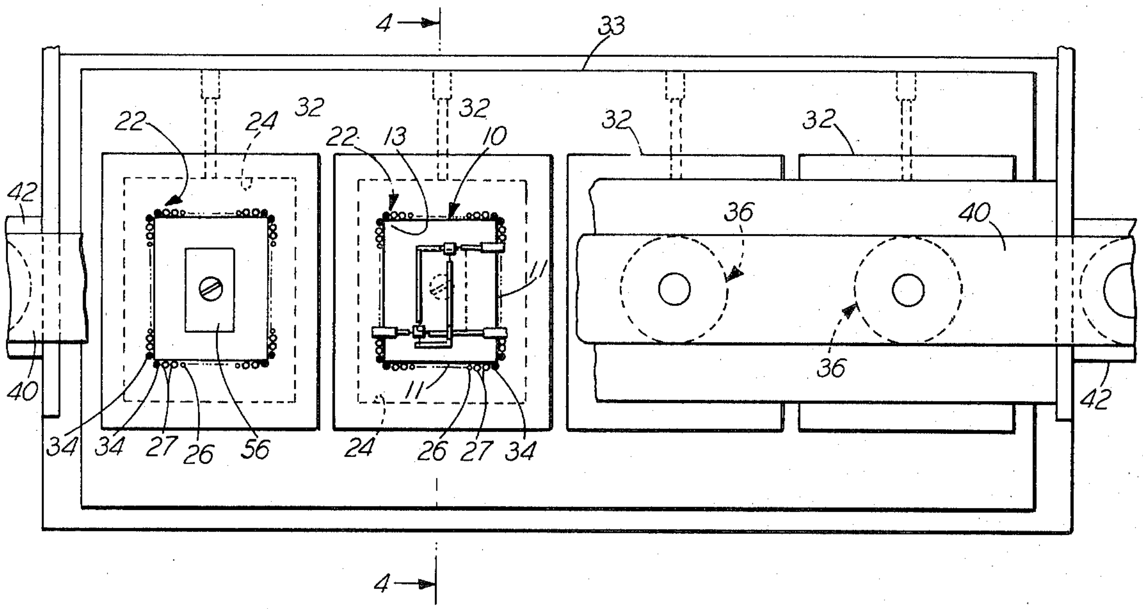
FIG. 3 is a plan view of four nests for holding the substrates and the orifices surrounding the substrates for flowing gas upwardly past their edges and drawing fluid rubber to said edges.
Figure 4:
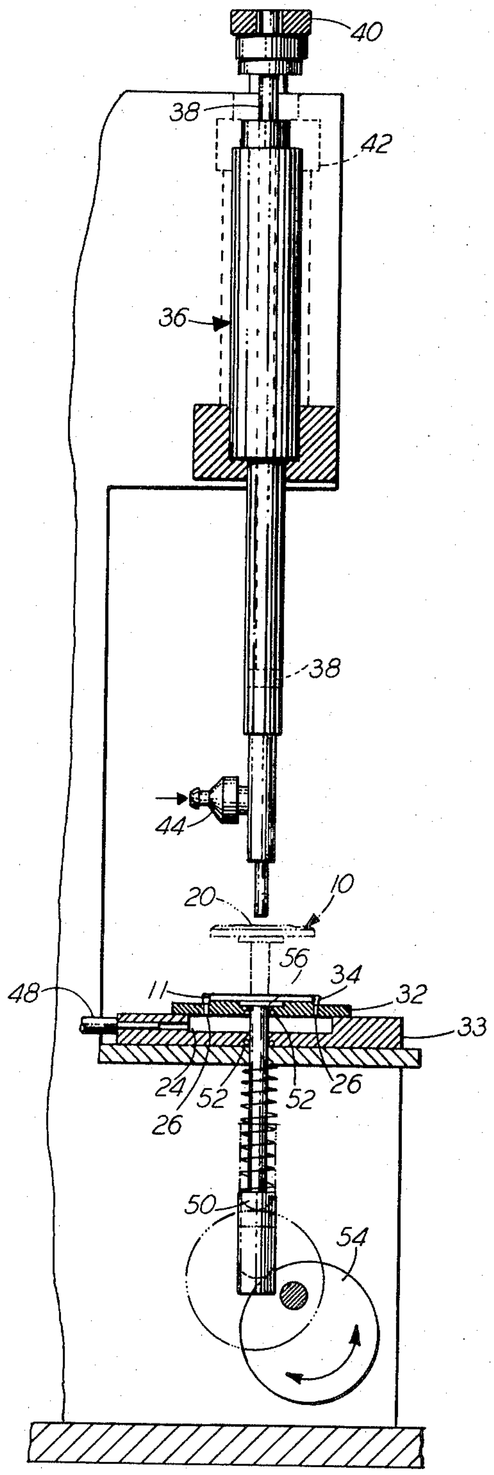
FIG. 4 is a cross-sectional view along line 4—4 of one of the nests of FIG. 3 showing a plenum, the orifices, a substrate elevator, and the fluid-rubber dispensers.

Approximately 1.7cc of fluid silicone rubber is applied to the 1.4 square inch surface of the substrate 10 in such a way that the coating 20 is even and of the desired thickness. The even coating 20 is achieved, in accordance with this invention, by placing the substrate 10 circuit-side up in a rectangular nest 22 (refer to FIGS. 2 and 3) and placing a desired, predetermined amount of fluid coating material at the approximate center of the upper surface (circuit side) of the substrate. Then, air from a plenum 24 (refer to FIG. 4) is discharged from orifices 26 past the edges 11 of the substrate 10. The static pressure of the air in motion at the edges 11, i.e., periphery of the substrate, is less than at the center and this causes air to move from the center of the substrate 10 toward the edges 11. The air, in turn, forces fluid material for the coating 20 to flow with it to the edges 11. However, the distance from the center of the substrate 10 to its corners 13 is greater than the distance from the center to the nearest points on the edges 11. As a result, the coating 20 must be more strongly urged toward the corners 13 than the edges 11 to achieve even distribution.

The coating material is more strongly urged toward the corners 13 by making the orifices at each corner or several corner orifices 27 larger than the orifices 26, (refer to FIG. 3) to increase the air flow at the corners and, thus, make the pressure lower there than at the edges 11.

When the coating material reaches the edges 11 of the substrate 10 it will tend to run over them. It is an advantage of this invention that the air flowing upward past the edges 11 of the substrate 10 will blow or force the coating material back and prevent it from flowing over.

Figure 2:
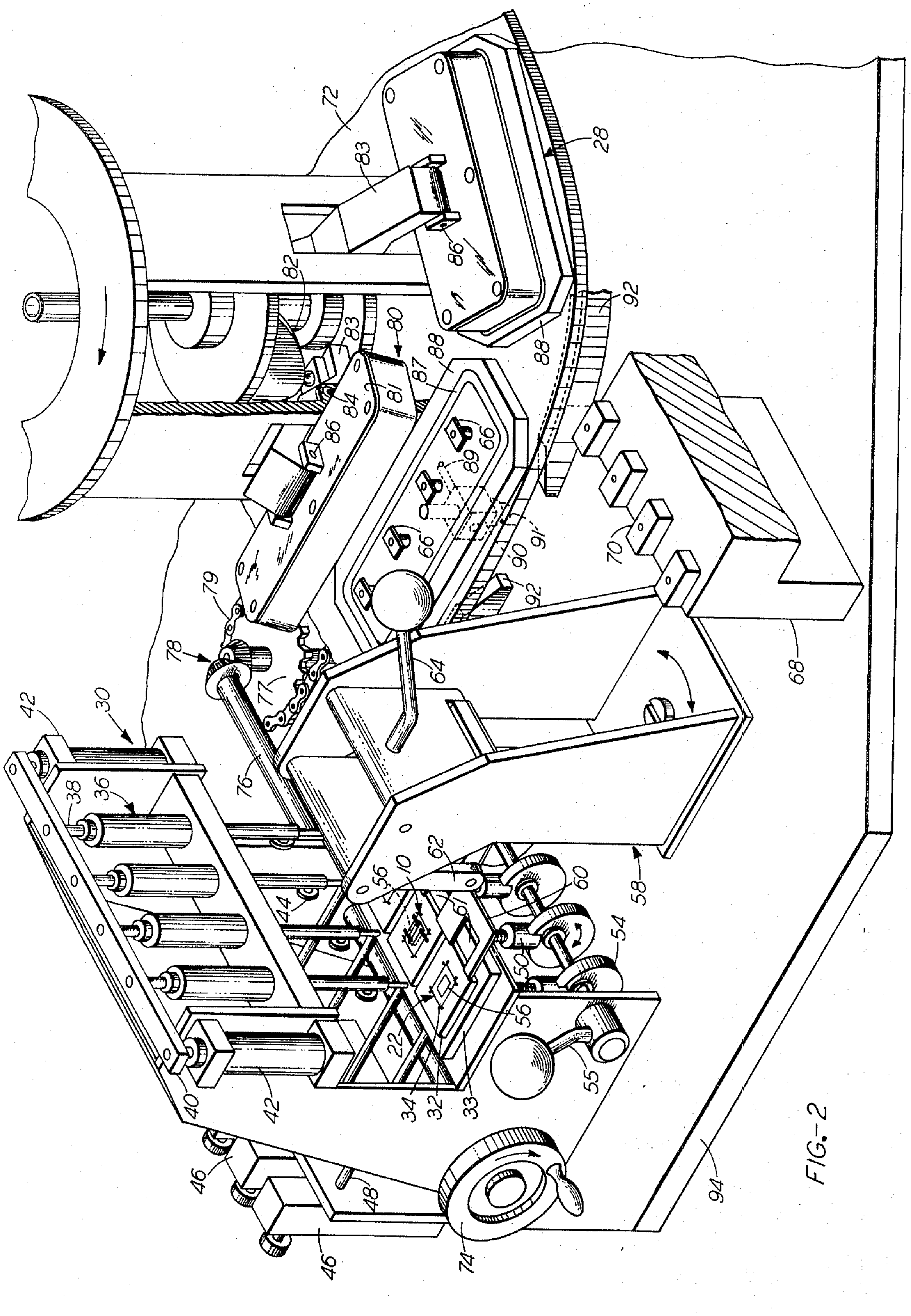
FIG. 2 is an isometric view of an apparatus for coating the thin-film circuit with silicone rubber.

In order to make sure that the coating 20 intimately contacts the entire top surface of the substrate 10 and penetrates under the devices 18 and crossover 16, the substrate is transferred to a vacuum chamber 28, refer to FIG. 2. Any air trapped under the crossover 16 and devices 18 and any gas trapped in the fluid coating material itself, is removed by holding the substrate 10 under vacuum in the chamber 28 for about 2 minutes. After the substrate 10 is removed from the chamber 28 and the coating 20 has cured, the thin-film circuit 14, including any devices 18 bonded thereto, will be encapsulated in a dense, continuous, protective coating of solidified silicone rubber about 0.010 to 0.013 inch thick.

Apparatus for Distributing the Fluid Coating

Referring again to FIG. 2, there is shown an isometric view of an apparatus 30 for carrying out the method of the invention. Nests 22 are mounted on a housing 32, which is supported on a base 33, and are formed by the top surface of the housing and locating pins 34 at the corners of each nest. The distances between the locating pins 34 are slightly larger than the corresponding external dimensions of the substrate 10 so that the substrate may be inserted easily in the nests 22.

Dispensers 36 (refer to FIGS. 2 and 4) are supported above the nests 22 to dispense the fluid coating material at the approximate center of each nest. The dispensers 36 include plungers 38, connected to a yoke 40 operated by air cylinders 42, and check valves 44. The dispensers 36 may be automatic syringes, such as those sold under the trade designation "Set 500, size S-205," by Scientific Industries, Inc., and are adjusted so that the desired amount of material is dispensed at each stroke of the plungers 38. When the plungers 38 are moved up, the coating material is drawn in through the check valves 44 (from a source not shown) and when the plungers are moved down, the material is dispensed onto the centers of the substrates 10.

Alternatively, the dispensers 36 (refer to FIGS. 3 and 5) may include: flexible tubes 37, connected at their upper ends to an overhead source of the fluid coating material (not shown) and at their lower ends to dispensing nozzles 39; fingers 41 supported by a yoke 43; and an air cylinder 45 connected to the yoke. The source provides a nearly constant head of fluid silicone rubber coating material on the tubes 37 which are pinched closed by the fingers 41. When the fingers 41 are moved away from the tubes 37 so that the tubes are no longer pinched, the coating material is dispensed from the nozzles 39 in accordance with the diameter of their opening and the length of time the tubes remain unpinched.

The nests 22 are surrounded by orifices 26 and 27. The orifices 26 are close to the edges 11 of the substrates 10, i.e., the centers are approximately 0.046 of an inch therefrom. The orifices 26 are about 0.032 of an inch in diameter while the orifices 27 are about 0.052 of an inch in diameter. Alternatively, the orifices 27 may be graduated in size so that the last five or six orifices gradually increase from approximately one thirty-second to one-sixteenth of an inch in diameter as the corners 13 of the substrate 10 are approached.

The orifices 26 and 27 connect to the plenums 24. Air from a suitable source (not shown) is admitted to the plenums 24 through flow meters 46 and flexible tubing 48 (refer to FIGS. 4 and 5). O-ring seals 52 maintain the plenums 24 air tight.

Cams 54 are rotated by means of a lever 55 to raise or lower elevators 50 and, therefore, platforms 56 which are fixed to them. When the elevators 50 are raised, the platforms 56 contact the undersides of the substrates 10 and raise them from the nests 22 so that the coated substrates may be lifted and placed in one of the vacuum chambers 28.

Figure 6:
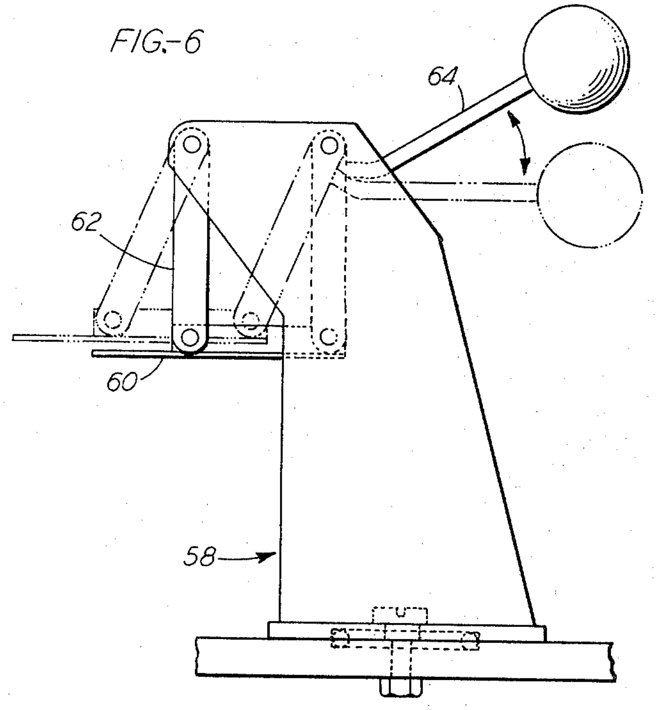
FIG. 6 is a side elevational view of a conveyor for transferring the substrate to a vacuum chamber.

The substrates 10 are lifted from the platforms 56 by means of a conveyor 58 (refer to FIG. 6) which pivots about its vertical axis. A paddle 60, having openings 61 to clear the platforms 56, is mounted on parallel-motion links 62 which are operated by a lever 64. The paddle 60 maintains its horizontal position parallel to itself, i.e., remains level, when the lever 64 rotates the links 62 clockwise or counterclockwise to raise or lower the paddle along a circular path in a vertical plane. The path is such as to bring the paddle 60 beneath the substrates 10 when the platforms 56, on which they rest, have raised them from the nests 22.

The conveyor 58 pivots 360 degrees on its vertical axis so that it may be aligned with the vacuum chamber 28. When the conveyor is pivoted to align with the chamber 28, the circular path followed by the paddle 60 is such as to lower the substrates 10 onto supports 66 in the chamber or raise them therefrom. Substrates raised from the supports 66 may be transferred to an unloading platform 68 by pivoting the conveyor 58 to align with the platform. Thus, the substrates 10 may be removed from the nests 22, placed in the chamber 28, removed from the chamber 28, and placed on an unloading platform 68 which has a fixture 70 to receive them.

Since the time required to coat the surface of the substrates 10 with the coating material is about one-fifth the time required to load, evacuate, and unload one of the chambers 28 to outgas the coated substrates, five chambers are mounted on a rotary table 72. Thus, four chambers 28 are evacuating gases while one is being unloaded and loaded and the coating operation is continuous. The chambers 28 are rotated into position for unloading and loading (refer to FIG. 2) by means of a handwheel 74, a driveshaft 76, and a chain drive. The chain drive consists of a drive sprocket 77, connected to the driveshaft 76 through a right angle drive 78; a driven sprocket (not shown), fixed to the table; and a chain 79, connecting the sprockets so that rotation of the handwheel 74 will revolve the table 72 about its vertical axis.

The chambers 28 have movable portions 80 which may be raised and lowered and which have transparent tops 81. The movable portions 80 are raised and lowered by a cam 82, which depresses the end of a lever 83 pivoted in bearings 84, as the chambers are moved into and out of the load-unload position. The movable portion 80 is pivotally connected by pins 86 to the lever 83 and seats against a rubber seal 87 in a fixed portion 88 of the chamber 28.

The chambers 28 are evacuated through a rotary vacuum joint by means of a mechanical vacuum pump (neither shown), e.g., such as that sold by the Welch Scientific Company under the trade designation "Welch Duo-Seal." However, a vacuum connection 89 is made to each chamber 28 through a cam operated three-way valve 90 having a spherical cam follower 91. A cam track 92, fixed to a machine bed 94 below the rotary table 72, supports the follower 91, except in the load-unload position, to keep the chamber 28 closed to the atmosphere and open to vacuum. When the chamber 28 moves into the load-unload position, the valve 90 is not held closed by the track 92 and shifts to its open position. The open valve 90 blocks the vacuum connection 89 and admits air to the chamber so that it can be opened. When the chamber 28 moves out of load-unload position, the cam track 92 shifts the valve 90 back to seal the chamber from the atmosphere and open it to the vacuum pump again so that the chamber evacuates.

Operation

Substrates 10 are placed in nests 22 with their circuit-side up and with the platforms 56 in their lowered position in the bottom of the nests. Air is admitted to each of the plenums 24 for distribution and discharge out of the edge and corner orifices 26 and 27, respectively. The required rate of flow will vary with the size of the substrate 10 and is initially determined by trial. For example, a 1 inch × 1.4 inch substrate requires a flow rate of about 50 cubic feet per hour from a plenum 24 having a nest 22 which is surrounded by a group of 46 orifices 26 plus sixteen corner orifices 27.

Figure 5:
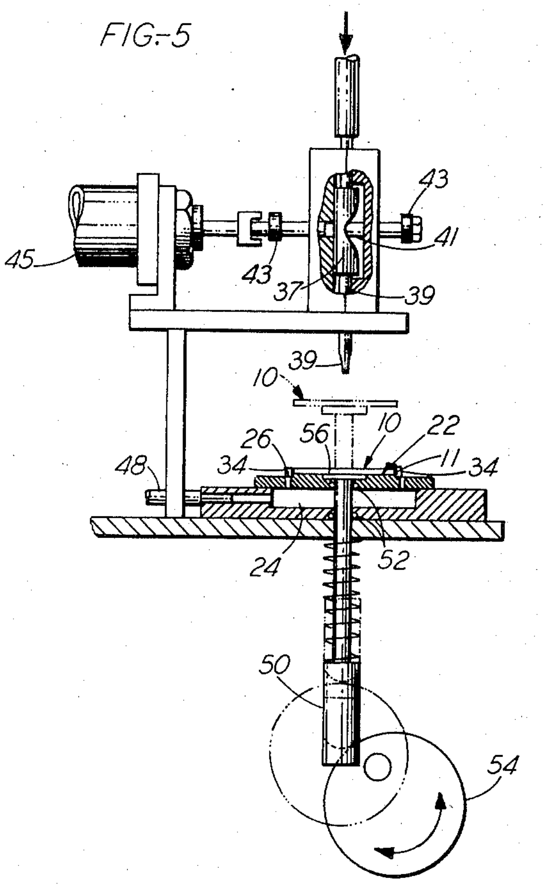
FIG. 5 is a cross-sectional view along line 4—4 of one of the nests of FIG. 3 showing a plenum, the orifices, a substrate elevator, and alternative fluid-rubber dispensers.

The air cylinders 42 (FIG. 4) are actuated once to dispense an exact amount of fluid silicone rubber coating material from the syringes, the amount having been previously determined and the dispensers 36 adjusted accordingly. Alternatively, if the dispenser of FIG. 5 is used, the air cylinder 45 is operated long enough to release the desired amount of coating material for the coating 20. For example, one nozzle 39 with an opening about 0.075 inch in diameter requires about 3 seconds to dispense the 1.7cc of silicone rubber.

When the entire surface has been coated, the lever 55 is rotated clockwise until the platforms 56 and substrates 10 are raised about three-fourths of an inch above the bottom of the nests 22. The conveyor 58 is aligned with the nests 22 and the lever 64 moved downward to rotate the links 62 clockwise, thus, raising the paddle 60 and lifting the substrates 10 off the platforms 56. The conveyor 58 is then pivoted clockwise around its vertical axis until it is aligned with the vacuum chamber 28. The lever 64 is then rotated counterclockwise to lower the substrates 10 onto the supports 66 in the chamber 28, the conveyor 58 pivoted out of the way, and the lever 55 rotated counterclockwise to return the platforms 56 to their position in the nests 22.

The next chamber 28 is rotated into position by means of the handwheel 74. This action causes the cam track 92 to lift the follower 91 and shift the vacuum valve 90 of the chamber 28 which was just loaded, so that the chamber is sealed from the atmosphere and opened to the vacuum pump. This starts evacuation of the chamber. Continued pumping, as time elapses due to moving more chambers into position and loading them, evacuates the chambers 28 to an absolute pressure of about 10 mm. of mercury.

When the table 72 has revolved once, the first-loaded chamber 28 is again in position and may be unloaded.

As this chamber 28 approaches the load-unload position, the cam track 92 allows the valve 90 to shift and open the chamber to the atmosphere and seal off the vacuum. Also, the cam 82 depresses the end of the lever 83 to raise the movable portion 80.

The substrates 10, with the thin-film circuits 14 coated are now removed from the supports 66 by aligning the conveyor 58 with the chamber 28 and operating the conveyor in the same manner as for loading the chamber. When the substrates 10 have been picked up by the paddle 60, the conveyor 58 is pivoted about its vertical axis and the substrates deposited on the fixture 70. The silicone rubber is then cured to form the tough, dense coating 20.

Thus, a method and apparatus for carrying out the method have been disclosed for evenly distributing a fluid over the surface of an article, particularly without having the fluid run over the edges.

While specific embodiments have been described in the foregoing specification to illustrate the invention, it will be understood that the invention is not limited to these embodiments. Various changes and modifications may be made without departing from the spirit and scope of the invention.

What is claimed is:

1. A method of distributing a liquid over the surface of an article, which comprises the steps of:

placing a predetermined amount of the liquid near the center of the surface of the article, said article having at least two intersecting, rectilinear edges; and flowing a fluid transversely past the edges of the article in such direction as to both draw the liquid to such edges and to prevent such liquid from overrunning said edges, and flowing said fluid more rapidly past the intersecting portions of the edges than the remainder of the edges so that the flow of liquid is greatest toward the intersection to produce a more even distribution of the liquid.

2. The method of claim 1, wherein the article having the liquid distributed thereover is subjected to a vacuum to remove any entrained gases.

3. A method of distributing a liquid over the surface of an article without overrunning the edges of the article, which comprises the steps of:

placing a predetermined amount of the liquid near the center of the surface of the article, the article being polygonal;

drawing the liquid to the edges of the article by flowing a fluid past said edges, the fluid flowing faster at the corners than the midpoints along the edges; and stopping the liquid at the edges so that it does not overflow them by directing the flow of the fluid upward past the edges.

4. A method of evenly distributing liquid material over the surface of a rectilinear article without overrunning the edges, the surface being in a substantially horizontal plane, which comprises the steps of:

positioning orifices around and adjacent the edges at the periphery of the article, the orifices being directed upward substantially perpendicular to the surface over which the fluid material is to be distributed and larger in size at the corners than at other portions of the periphery;

placing a predetermined amount of the liquid material near the center of the surface of the article; and discharging gas rapidly through the orifices past the edges of the article to draw the liquid material to the edges of the article, to prevent its overrunning said edges and to evenly distribute the liquid material out to the corners of the article.

5. A method of distributing liquid silicone rubber over a thin-film circuit on the circuit side of a substrate, the substrate being substantially horizontal and rectangular, which comprises the steps of:

placing the substrate circuit-side up in a rectangular nest portion of a plenum to locate and support the substrate;

placing a predetermined amount of the silicone rubber on the circuit side of the substrate near its center;

positioning orifices in the plenum around the edges of the rectangular nest, the orifices near the corners of the nest being larger than those near the midpoints of the edges of the nest;

blowing air through the orifices past the edges to draw the silicone rubber evenly over the surface to the edges and corners, while preventing the rubber from overrunning the edges, to evenly coat the thin film circuit on the substrate;

transferring the coated substrate to a vacuum chamber;

evacuating the chamber to remove any entrained gases from or under the silicone rubber and to provide a continuous dense, protective coating over the substrate to encapsulate the circuit; and removing the encapsulated thin-film circuits from the chamber.

6. An apparatus for distributing a liquid over a surface of a polygonal article, which comprises:

means for dispensing a predetermined amount of the liquid near the center of the surface of the article; and means for flowing a fluid adjacent and upward past the edges of the article, faster at the corners than at the midpoints of the edges of the polygonal article to draw the liquid evenly over the surface out to the corners and edges and to prevent the liquid from overflowing the surface at the edges.

7. The apparatus of claim 6 wherein the liquid dispensed is silicone rubber.

8. The apparatus of claim 7 wherein the fluid is air.

9. The apparatus of claim 8, wherein the means for flowing the fluid includes a nest to receive the article, a plenum beneath the nest, and orifices in the plenum arranged around the periphery of the article adjacent the edges of said article for discharging fluid past said edges.

10. The apparatus of claim 9, wherein the orifices near the corners of the article are larger than the orifices remote from the corners.

11. The apparatus of claim 9, wherein the orifices gradually increase in size as the corners of the article are approached.

* * * * *